Sept. 29, 1964 V. R. KAUFMAN 3,150,735
HANDLE CONTROLLED VEHICLE
Filed Dec. 3, 1962 3 Sheets-Sheet 1
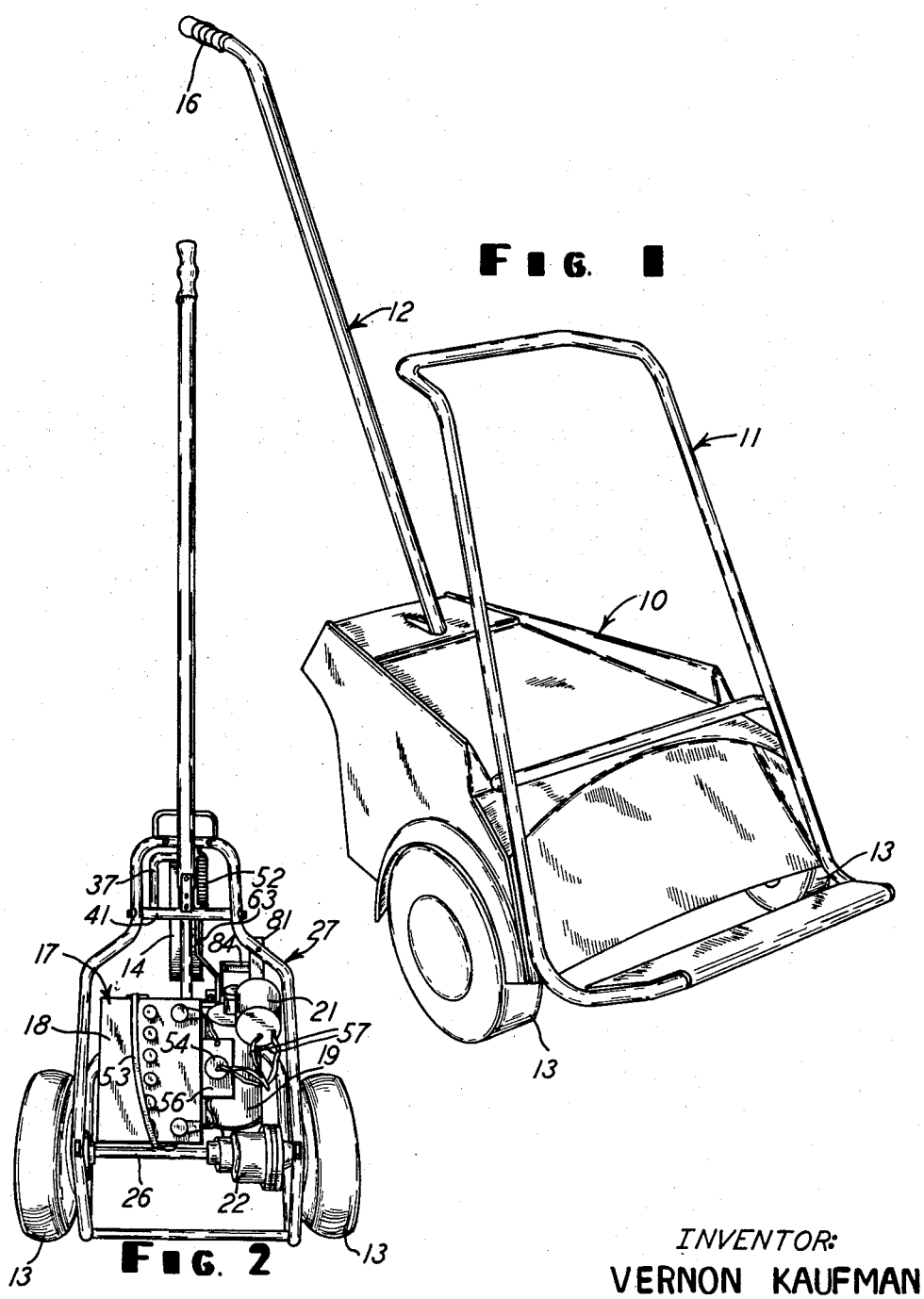
INVENTOR:
VERNON KAUFMAN
BY *Arthur J. Hausmann*
ATTORNEY

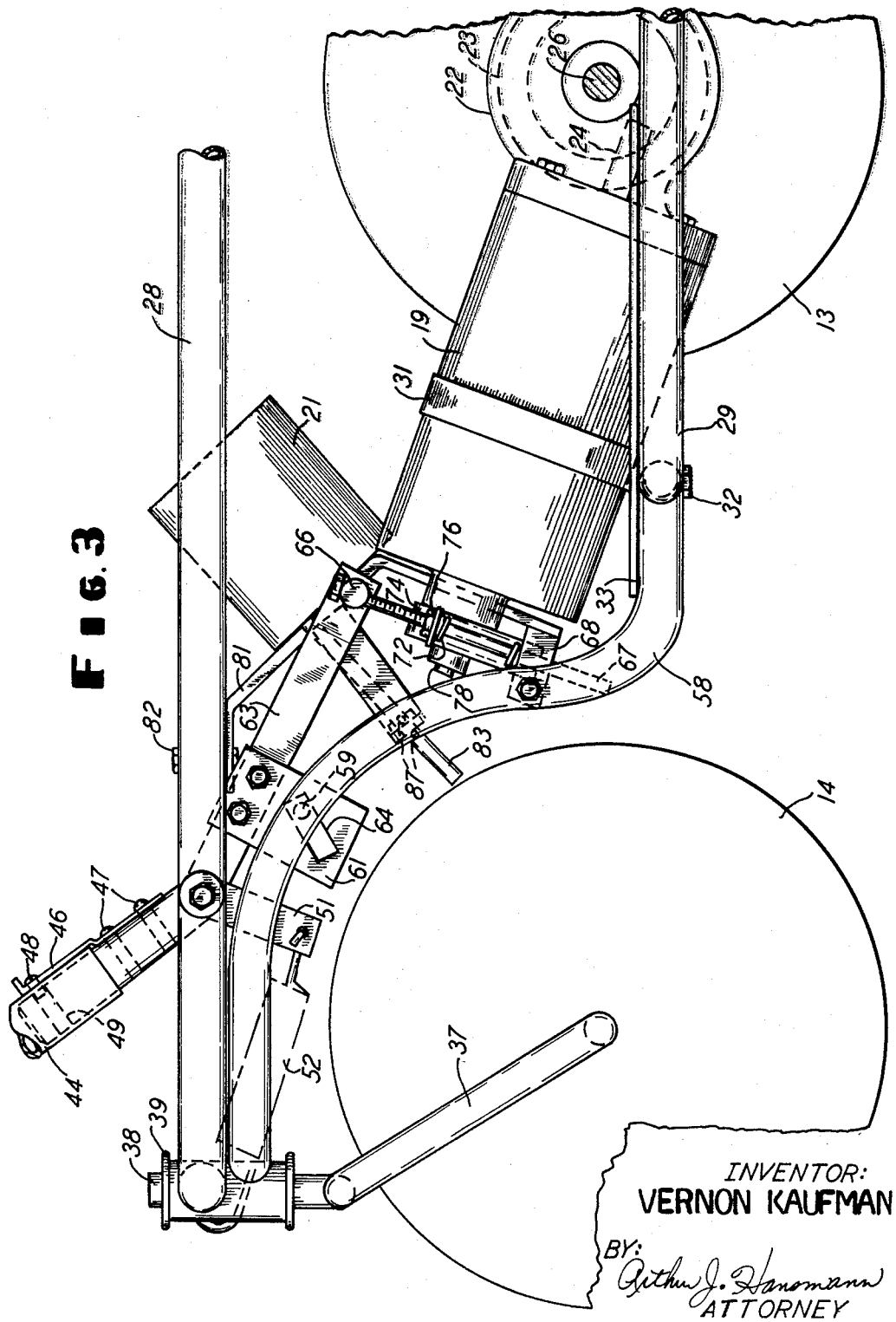

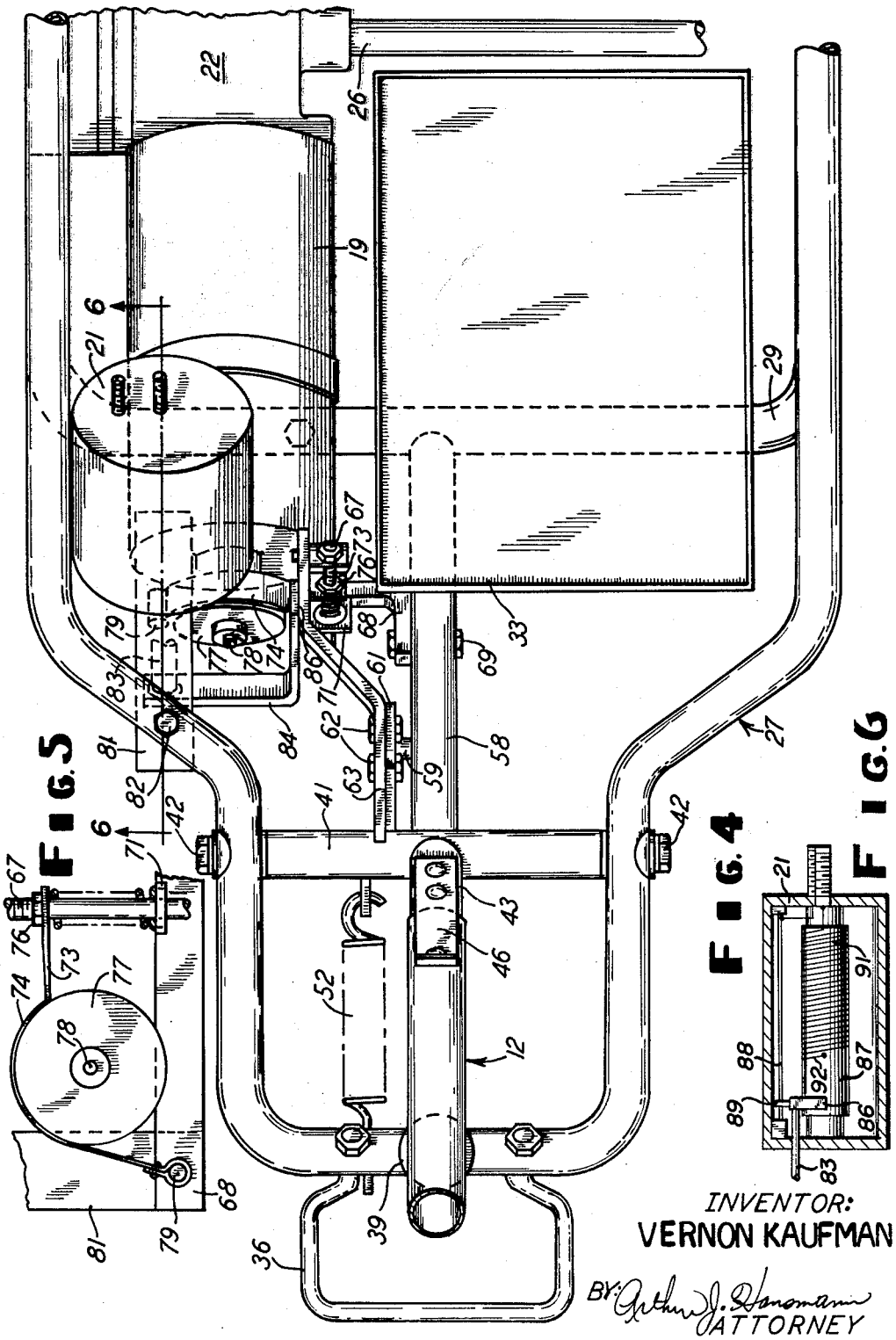

United States Patent Office 3,150,735
Patented Sept. 29, 1964

3,150,735
HANDLE CONTROLLED VEHICLE
Vernon R. Kaufman, 821 Kingston Ave., Racine, Wis.
Filed Dec. 3, 1962, Ser. No. 241,602
2 Claims. (Cl. 180—19)

This invention relates to a powered vehicle and it has particular application to the transportation of golf bags and accordingly it is hereinafter so described.

It is a general object of this invention to provide a powered vehicle which is intended for use in transporting objects of a weight of only a few pounds, but which is nevertheless sturdy, completely steerable, powerful for the purpose intended, and which has both a braking position and a running position provided in its control.

A more specific object of this invention is to provide a powered vehicle which may be a golf bag cart, as shown herein, and to so provide the vehicle that it can be easily maneuvered by a single control accessible to an operator who is walking adjacent the vehicle, and with the control providing a secure braking position, and a speed controlled running position, and an intermediate free wheeling position where neither the power is applied, nor the brake is applied, but the vehicle can be pushed or moved manually.

Still a further object of this invention is to provide a golf bag cart or like vehicle of transportation wherein the vehicle control is a combined steering and power control member arranged so that the vehicle has a positive braking position which is automatically effective upon release of the control member.

Still a further object of this invention is to provide a golf bag cart or like vehicle of transportation wherein the ner that the cart can be easily steered through a control handle which is sturdily connected to the cart so that the steering is easy but firm and positive in the guidance of the cart.

Other objects and advantages will become apparent upon reading the following description in light of the accompanying drawings wherein:

FIG. 1 is a side perspective view of a preferred embodiment of this invention.

FIG. 2 is a top perspective view of a photographic type showing the embodiment of FIG. 1 with the body portion thereof removed.

FIG. 3 is an enlarged side elevational view of a fragment of that shown in FIG. 2.

FIG. 4 is a top plan view of FIG. 3 with additional parts added.

FIG. 5 is a front elevational view showing an enlarged portion of FIG. 4.

FIG. 6 is a sectional view taken on the line 6—6 of FIG. 4 and being on a slightly reduced scale.

The same reference numerals refer to the same parts throughout the several views.

As previously mentioned, the shown embodiment of this invention is a golf cart for carrying golf bags while the golfer walks adjacent the cart, and this is as indicated in FIG. 1, however the driving and control means of the cart and the steering means and arrangement and other like features are not of course to be limited to the golf cart art because they find application in any powered vehicle, and it should be so understood. Nevertheless, description at least with respect to FIG. 1 is directed at the golf cart, and here it will be noted that the cart basically includes a body 10 which covers and encloses operating mechanism shown in the other views, and the cart includes the bag rack 11, the operating handle 12, and the ground wheels 13. With respect to the ground wheels, it will be noted that two rear wheels 13 are provided, and FIG. 2, for instance, shows there is also a front wheel 14 so that a three-wheeled vehicle is shown. At this time it will also be generally mentioned that the operator. runs the vehicle by grasping the handle grip 16 and depressing same to control the driving means and cause the vehicle to move in the direction of the grip 16. Thus the vehicle trails the user who can therefore walk in advance of the vehicle. Also, in general consideration, it will be understood that the rack 11 will support golf bags (not shown) or like equipment can be supported for the transportation desired.

FIG. 2 shows the driving means to be generally designated 17 and this means is shown to be of the electric type with the components thereof interconnected through basically the parts of a battery 18, a motor 19, and a rheostat 21. Through the motor 19, the driving means is thus operatively interconnected to the wheels 13 by means of a differential or like gearing indicated 22 in FIGS. 1 and 3. Thus in any conventional manner a ring gear indicated on the line 23 of FIG. 3 is in mesh with a driving gear indicated on the line 24, and the gear 24 is of course of a conventional type powered by the motor 19 and is connected thereto. An axle 26 supports the differential gear housing 22 and the wheels 13 in any suitable manner, and in turn, the vehicle frame 27 is connected to the axle 26 to support the driving means 17.

The frame 27 therefore is shown to consist of an upper section 28 and a lower section 29, and FIGS. 3 and 4 particularly show the motor 19 is attached to the frame by means of the strap 31 connected to the lower section 19 through the bolt 32, and the battery 18 is supported on the frame by the platform designated 33 supported on the lower frame 29 in any suitable manner.

It will also be noted that a handle 36 is attached to the frame 27 and is therefore available for lifting the frame as it will be understood that golfers would transport the cart in the trunk of a car, and therefore desire to lift the cart for placing into the trunk or for any other purpose. Also, the front wheel 14 is supported in an arm 37 which extends from the center of the wheel to an upright shaft 38. The latter is rotatably received in a swivel connection or socket 39 so that it can of course rotate and act as a caster connection to provide wheel 14 as a castering wheel. Of course the socket 39 is attached to the frame 27 in any suitable manner.

In conjunction with the forwardly disposed castering wheel 14, the vehicle is made easily steerable and completely controllable by means of the connection between the handle 12 and the frame 27. Thus, a member 41 is connected onto the frame 27 by bolts 42 to be pivotal about the axis of the bolts, and a shaft 43 extends upwardly from the member 42 and is suitably attached thereto to telescope inside the lower end 44 of the tubular handle, as shown in FIG. 3. A spring latch 46 is connected to the shaft 43 by rivets 47, and a pin 48 is attached to the latch 46 to be engaged in a groove 49 in the shaft 43. Thus of course release of the latch 46 by raising the same and thereby removing the pin 48 from the groove 49 will permit the handle 12 to be removed from the frame.

It will be further noted that a bracket 51 also projects from the member 41 and is suitably attached thereto to rotate with the member 41, and a tension spring 52 is connected between the member 51 and the forward portion of the frame 27 to yieldingly urge the connection described and the handle 12 in a clockwise direction as seen in FIG. 3 and thus keep the handle raised upwardly until it is depressed by the operator when the vehicle is to be maneuvered. Because of the length of the member 41 and its connection to the sides of the frame 27, as shown in FIG. 4, the handle provides a sturdy but easy and accurate steering control of the entire cart.

With respect to the power plant or driving means 17, it will also be understood that the battery 18 has a strap 53 which facilitates lifting the battery from its support 33. Prior to this, the battery is of course unplugged with respect to the remainder of the driving means and a plug 54 is connected to the battery terminal plate 56 so that the wires 57 extending from the rheostat 21 to the battery 18 are disconnected, and thereby the battery can be removed as mentioned.

Control of the driving means will now be described. Initially, however, it will be noted that a frame piece 58 extends between the frame lower portion 29 and the front of the upper portion 28, and is suitably connected therebetween. A pin 59 is attached to the frame piece 58 and projects into a plate 61 which is secured by bolts 62 to an arm 63 suitably attached to the member 41 to rotate with the latter. It will therefore be noted that the plate 61 has a slot 64 which receives the pin 59, and thus the plate and all its attending connections, of course including the handle 12, are limited in pivotal action by the pin 59.

The lower end of the connecting member 63 has a rotatable piece 66 extending therefrom and connected to a bolt 67 which depends from the piece 66. Also a bracket 68 is attached to the frame member 58 by the bolt 69 and a portion 71 of the bracket 68 receives the lower end of the bolt 67 to slidably guide the latter in its axial movement in response to pivotal movement of the handle 12. Thus a compression spring 72 is disposed between the portion 71 and an end 73 of a brake band 74, and a nut 76 secures the brake band end 73 on the top thereof, and therefore the band 74 is controlled by the arm 63 and its pivotal motion.

The forward end of the motor 19 has a circular member 77 attached to the motor shaft 78 to rotate therewith and it will be noted particularly in FIG. 5 that the brake band 74 extends over the member 77 in its extent between the stud 67 and a pin 79 which is mounted on the end of the bracket 68. It will therefore be understood that upon depressing the handle 12, the extension 63 is pivoted about the axis of the member 41 to raise the member 66 and the stud 67 and thereby raise the brake band 74 off the circular member 77 and release the shaft 78 and permit the motor 19 to operate. Of course when the spring 52 is urging the control parts in the direction opposite to that just described, then the brake band 74 is securing the motor shaft 78 against rotation, and this therefore provides a brake for the vehicle.

A brace 81 is connected by bolt 82 to the frame 27 and extends therefrom to the bracket 79 and is suitably connected to the latter. The brace 81 also is suitably connected to the rheostat 21, as best shown in FIG. 3, in its relationship, and thus the latter rheostat 21 is adequately supported in the driving means. The rheostat 21 has an extending control in the form of a shaft 83 which projects through a bracket 84 also attached at 86 to the extension 63. It will therefore be understood that the pivotal motion of the extension 63 likewise displaces the bracket 84 and therefore axially displaces the control 83 of the rheostat 21. Such displacement is achieved through two pins 87 which project through the shaft 83 and are disposed above and below the bracket 84 for positive displacement of the shaft 83.

It will therefore also be understood that the downward pivotal movement of the handle 12 initially releases the brake comprising the band 74 and the circular member 77, and ultimately the movement displaces the control 83 so that the rheostat 21 is placed in an operative position to adequately close the electrical circuit in the driving means and to thereby operate the motor 19 and propel the vehicle. It will also be understood that an intermediate or free-wheeling position is provided between an inoperative position of the driving means when the control 83 is downward, and the operative position when the control 83 is upward as just described. This free-wheeling position is achieved when the brake band 74 is first removed from the circular member 77 to free the latter for rotation, but prior to engagement of the rheostat 21. The brake band 74 simply remains in the freed position and thus the vehicle is not propelled by the electric power which is not yet in a closed circuit position, but instead the vehicle can simply be pushed or pulled manually. This is therefore a free-wheeling position which occurs intermediate the brake position and the driving position, and it will be appreciated that the rheostat 21 and its control 83 are arranged between the positions mentioned to provide the free-wheeling feature. This therefore simply means that the initial movement of the rheostat control 83 does not close the circuit in the rheostat 21, but there is in the nature of a lost motion on the control 83 which must therefore be raised to a further position before the rheostat 21 is operative for the purpose of closing the circuit and driving the motor 19. The lost motion is simply effected by having the rheostat arranged so that its coil is not contacted by the adjustable or sliding mechanism until a certain displacement of the latter is achieved. Thus FIG. 6 shows a sectional view of the rheostat 21 with the control 83 extending into the rheostat and being fixed to the usual electrically conductive sliding contact 86 which extends over the rheostat winding core 87 for sliding therealong in accordance with axial displacement of the control 83. Also the usual electrically conducting rod 88 is disposed within the rheostat and has electrical contact with the slide 86 through the member 89 which slides along the rod 88. The rheostat 21 also then has its conventional windings 91 disposed along the core 87 but to only one end thereof so that the slide 86 must move to the point designated 92 where the coils 91 commence before electrical connection is made in the rheostat. Thus the slide 86 can move from its position shown to the point 92 before electrical connection is made and therefore there is lost motion between the two points indicated.

It will also be understood that the spring 72 on the brake control mechanism provides for a positive release of the brake when the arm 63 is raised, and the nut 76 provides for adjustment of the brake control since it can of course be threaded up and down on the stud 67 to a desired position with respect to the other parts attached thereto.

While a specific embodiment of this invention has been shown and described, it should be obvious that certain changes could be made therein and the invention therefore should be determined only by the scope of the appended claims.

What is claimed is:

1. A powered vehicle comprising driving means including a battery and an electric motor and a rheostat with electric wires and with an electric control for said rheostat and with all electrically connected together, said electric control being movable and having an operative position and an inoperative position and being arranged with a lost motion connection to said rheostat by having said electric control spaced from the electric wires of said rheostat in the inoperative position of said electric control so that initial movement of said electric control is lost motion movement in that the circuit in said rheostat remains deenergized, ground wheels drivingly interconnected with said driving means and movably supporting the latter, brake means operatively interconnected with said ground wheels and having a brake-secure position and brake-release position with respect to said ground wheels, said brake means including a movable control member for effecting said positions, a handle operatively interconnected with said electric control and said brake control member for moving the latter two and for setting them in their respective said positions, said electric control and said brake control member being located with respect to and being connected to said handle and both being respectively located so that said brake control member is movable during said lost motion movement of said electric control and prior to movement of said electric control to said operative position so that said brake means is in said brake-release position when said electric control is still in said inoperative position, for effecting a free-wheeling position prior to setting said electric control in said operative position to power said ground wheels.

2. A powered vehicle comprising driving means including a battery and an electric motor and a rheostat with electric wires and with an electric control for said rheostat and with all electrically connected together, said electric control being movable and having an operative position and an inoperative position and being arranged with a lost motion connection to said rheostat by having said electric control spaced from the electric wires of said rheostat in the inoperative position of said electric control preceding movement to said operative position whereby said electric control can be initially moved before reaching said operative position thereof, ground wheels drivingly interconnected with said driving means and movably supporting the latter, brake means operatively interconnected with said ground wheels and having a brake-secure position and a brake-release position with respect to said ground wheels, said brake means including a movable control member for effecting said positions, a single handle operatively interconnected with both said electric control and said movable control member of said brake means for setting the two in their respective said positions, said handle being movable in one direction for operating both said electric control and said movable control member of said brake means, a spring operatively connected to said handle for moving the latter in the other direction, both said electric control and said brake control member being relatively located and arranged in a relation that said brake means is in said brake-release position when said electric control is in said lost motion initial position preceding said operative position, and said electric control and said brake control member being relatively located and arranged in a relation that said brake means is in said brake-secure position when said electric control is in said inoperative position, and said spring related to said handle for urging said handle into said other direction for effecting the latter said positions when the operator releases said handle.

References Cited in the file of this patent

UNITED STATES PATENTS

| | | |
|---|---|---|
| 2,327,583 | Framhein | Aug. 24, 1943 |
| 2,815,083 | Ellingsworth | Dec. 3, 1957 |
| 2,840,175 | Vlinski | June 24, 1958 |
| 2,879,858 | Thomas | Mar. 3, 1959 |
| 2,937,706 | Chandler | May 24, 1960 |
| 2,962,106 | Burnside et al. | Nov. 29, 1960 |

FOREIGN PATENTS

| | | |
|---|---|---|
| 470,589 | Great Britain | Aug. 18, 1937 |
| 606,857 | Great Britain | Aug. 20, 1948 |